United States Patent [19]

Burke et al.

[11] 4,159,432
[45] Jun. 26, 1979

[54] ANALOG SIGNAL MANIPULATION USING CHARGE TRANSFER TECHNIQUES

[75] Inventors: Michael J. Burke; Michael M. Siverling, both of Rochester, Minn.; Raymond J. Wilfinger, LaGrangeville, N.Y.

[73] Assignee: International Business Machines Corporation, Armonk, N.Y.

[21] Appl. No.: 855,870

[22] Filed: Nov. 30, 1977

[51] Int. Cl.² .................. H03K 5/153; H03K 5/18
[52] U.S. Cl. .................. 307/358; 307/221 D; 307/351; 307/353; 340/146.3 AG
[58] Field of Search ............. 307/221 C, 221 D, 351, 307/353, 358, 360, 359; 340/146.3 C, 146.3 AG

[56] References Cited

U.S. PATENT DOCUMENTS

| 3,891,977 | 6/1975 | Amelio et al. | 307/221 D |
| 4,001,501 | 1/1977 | Weimer | 307/221 D |
| 4,021,682 | 5/1977 | Elmer et al. | 307/221 D |

Primary Examiner—John Zazworsky
Attorney, Agent, or Firm—John E. Hoel

[57] ABSTRACT

Analog voltage levels derived from optically scanning a document or from magnetically scanning a magnetic record, depend upon the variable amplitude of a background signal. The analog voltage levels are processed by a bucket brigade circuit to set a threshold from which a binary decision may be made as to the presence of a black or white indicium in optical recognition or a one (1) or zero (0) bit in magnetic reading.

5 Claims, 2 Drawing Figures

ANALOG SIGNAL MANIPULATION USING CHARGE TRANSFER TECHNIQUES

FIELD OF THE INVENTION:

The invention disclosed broadly relates to bucket brigade FET circuits and more particularly relates to such circuits as applied to analog signal manipulation.

BACKGROUND OF THE INVENTION:

Description of the Prior Art

Prior art optical character recognition systems incorporate means for automatically varying the discrimination reference level which a video pulse must exceed in order for the pulse to be recognized as a black or character pulse rather than as a white or document background pulse. For example, in one prior art single channel system, the areas of a moving document are time-sampled in series by a rotating slitted disc through which light passes to a photo-multiplier tube. The discrimination reference level for each video pulse is automatically adjusted by varying the cut-off level of a contrast tube in accordance with the greatest amplitude of recently sensed black video pulses.

In another example of the prior art, each video pulse corresponding to a document area being scanned by a two-dimensional array of photo cells is compared with the average value of the video pulses corresponding to areas surrounding the area being scanned, and a black or character recognition signal is generated only when the video pulse corresponding to the scanned area exceeds the average blackness of the surrounding areas.

Each of these prior art circuits occupy a large space and are not amenable for use in a hand-held optical character recognition device.

OBJECTS OF THE INVENTION

It is therefor an object of the invention to provide an improved automatic threshold setting circuit for a hand-held optical character recognition device.

SUMMARY OF THE INVENTION

This and other objects, features and advantages of the invention are accomplished by the analog signal manipulation circuit disclosed herein. Analog voltage levels derived from optically scanning a document or from magnetically scanning a magnetic record, depend upon the variable amplitude of a background signal. The analog voltage levels are processed by a bucket brigade circuit to set a threshold from which a binary decision may be made as to the presence of a black or white indicium in optical recognition or a one (1) or zero (0) bit in magnetic reading.

One aspect of the invention is a circuit for following input signal peaks which includes a clock for quantizing the input signal in time, a bucket brigade device for transferring to a last stage a series of charge packets whose magnitude represents the time quantized input signals, selectable first and second paths capable of transferring each charge packet out of the last stage, a holding capacitor coupled to the first path such that the capacitor voltage represents the total accumulated charge transferred to the first path, and a comparator for selecting the first path when the voltage at the last stage is greater than the voltage of the holding capacitor.

As a further aspect of the invention, the circuit includes a selectable third path capable of transferring each charge packet out of the last stage, a further holding capacitor coupled to the third path, and a further comparator for selecting the third path when the voltage at the last stage is less than the voltage of the further holding capacitor. The clock produces non-overlapping signals to prevent leakage in the bucket brigade device so that at least one of the clock signals gates the comparators, to eliminate the effects of voltage spikes from the clock signals.

DESCRIPTION OF THE FIGURES

This and other objects, features and advantages of the invention will be more fully appreciated with reference to the accompanying drawings.

DISCUSSION OF THE PREFERRED EMBODIMENT

The problem solved by this invention is the establishment of analog voltage levels which are dependent upon background and contrast of a scanned document. The voltages in turn are used to set a threshold from which a binary (black-white) decision may be made. The circuit finds application among other things, as the black/white peak follower circuit 36 in the optical signal processor disclosed in the copending U.S. patent Ser. No. 817,465 to H. Leighton, et al. filed 7/20/77, assigned to the instant assignee.

In optical character recognition it is necessary to detect and store both the minimum (white) and maximum (black) signal levels contained in an analog waveform. This is generally done using complex analog bipolar circuits which, depending on the accuracy required, may or may not be integrated. One object of this invention is to perform this circuit operation using charge transfer devices so that the circuit can be integrated in FET technology. The advantage of the approach, in addition to reduced size, is reduced power and lower cost.

Figure 1:
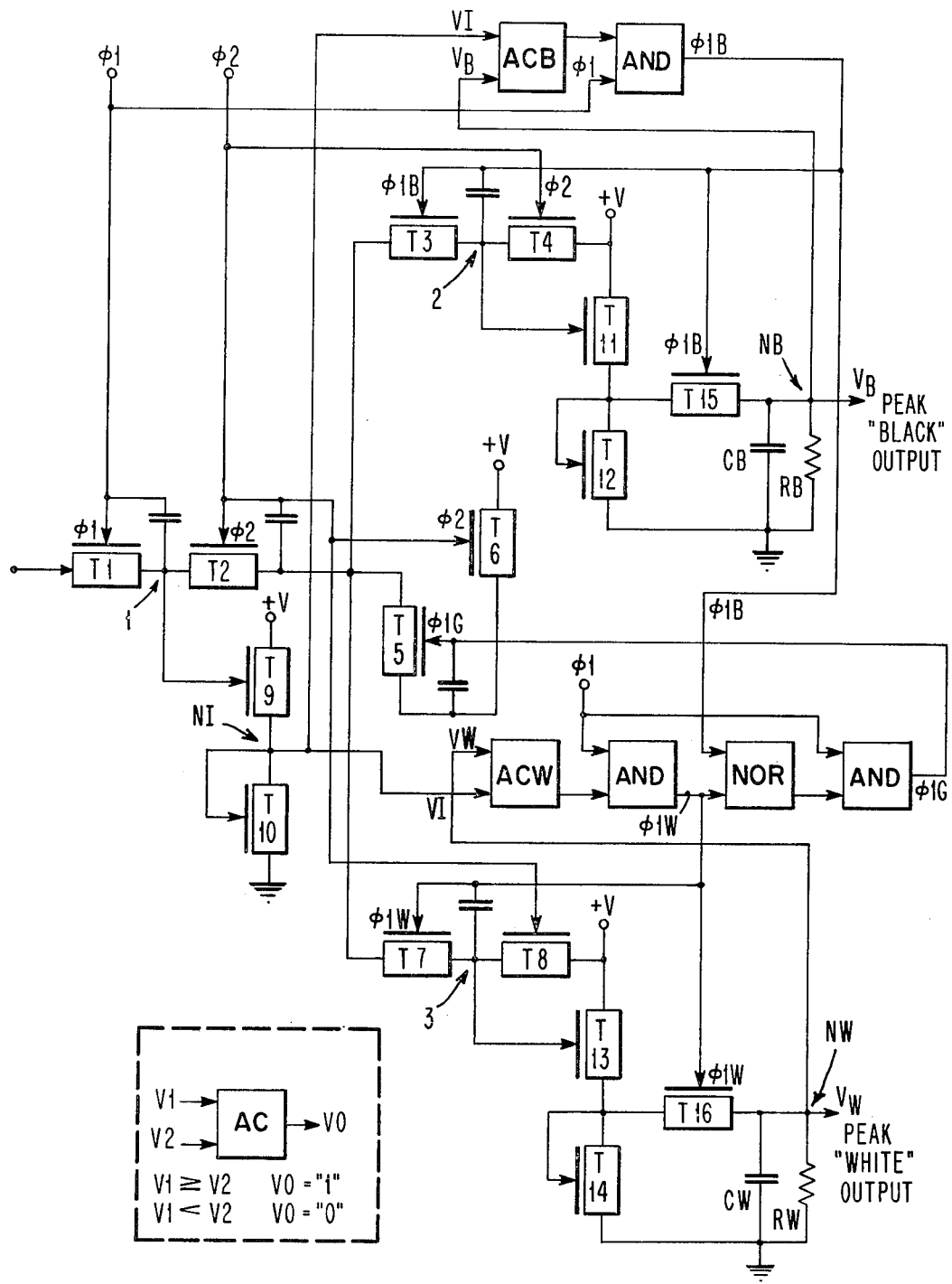
FIG. 1 shows a schematic circuit diagram of the invention.

FIG. 1 shows the basic circuit invention. The circuit is shown implemented in Bucket Brigade Devices (BBD), but using the basic concepts described here, it may also be done using Charge Coupled Devices (CCD). T1 and T2 are the continuations of a BBD delay line on which the sampled analog signal is contained. A non-destructive tap made up of a source followers T9 and T10 makes the information at node 1 available at node NI. After leaving T2 the analog information contained on the BBD delay line can follow one of three paths, "black," "gray," or "white." The path the analog information will follow is determined by the gate voltages applied to T3, T5, or T7 which are labeled $\phi 1B$, $\phi 1G$, and $\phi 1W$, respectively. Depending on which path is active, T4, T6 or T8 then acts as the termination, or precharge device for the BBD delay line which include T1 and T2. It should be noted that the intent in the circuit described here is that only one path of the three possible is activated during any one clock cycle.

One non-destructive tap senses the signal on that portion of the delay line made up of T3 and T4. A second non-destructive tap senses the signal on the portion of the delay line made up of T7 and T8. Both taps use source followers that are identical to the source follower at node 1. Transfer gates T15 and T16 allow the signals from their respective source followers to sample and hold that signal on nodes NB and NW.

Considering the "black" circuit first, the analog signal VB is compared by the comparator ACB to the voltage VI. The dashed insert in FIG. 1 shows the transfer function for the inputs V1 and V2 and the outputs V0 of the generalized comparator AC, the comparators ACB and ACW having the same transfer characteristics. If the voltage at node NB is less than the voltage at node NI (both voltages are attenuated and offset by matching source followers) the comparator output comes "up," turning on the gates of T3 and T15 through the AND logic circuit, charging node NB to the new VB value. If the voltage at node NI is less than the voltage at node NB, either the "gray" or "white" circuits will take control. When the voltage at node NI is less than the voltage at node NW, the analog comparator ACW generates a logic "1" which causes the gates of T7 and T16 to turn on through the AND logic circuit and route the incoming signal to the node NW. In the event that the incoming signal at node 1 is neither more than the voltage at node NB or less than the voltage at node NW, logic is performed on the output of the two comparators and a $\phi 1G$ waveform is generated from the NOR logic circuit, which routes the incoming signal to the "gray" channel where it is discarded by being conducted to a supply voltage +V. Additional logic may be added to FIG. 1 to prevent "lock-up" conditions. The AND and NOR logic circuit labels in FIG. 1 refer to conventional two input AND and two input NOR logic functions.

The circuit in FIG. 1 allows a new peak value and new minimum value of an analog signal to be recognized and stored. The length of time the information is stored depends upon the RC time constants at nodes NB and NW. The circuits take advantage of binary logic circuits, but the analog signals themselves are not converted to digital form. The result is that the function can be built in MOSFET technology allowing maximum density to be achieved because of the circuit simplicity and low power dissipation.

An alternate embodiment of the circuit in FIG. 1 is to replace the inputs $V_B$ and $V_W$ of comparators ACB and ACW with two separate voltage sources (that may or may not be a function of the incoming signal) to drive the comparators. With such a scheme, the output of "black" channel would contain only that portion of the incoming signal above a first predetermined amplitude. By the same reasoning, the "white" channel would contain only that portion of the incoming signal below a second predetermined amplitude and the "gray" channel would contain all that lies between. Thus, the equivalent to peak (or valley) clipping (or retention) has been performed using charge transfer techniques.

Figure 2:
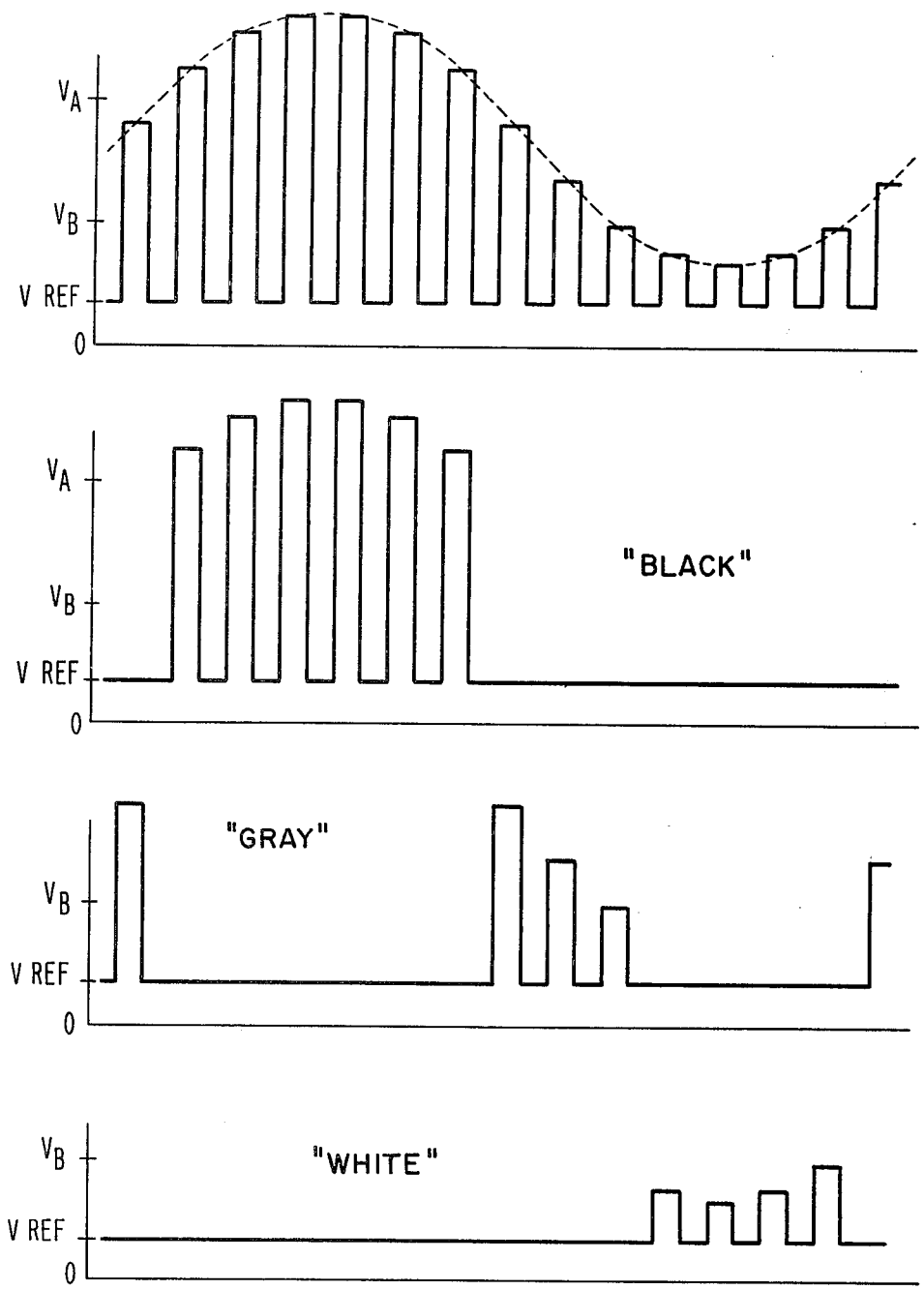
FIG. 2 shows a voltage waveform diagram for the output channels of the circuit shown in FIG. 1.

FIG. 2 shows the output of the three channels for a representative input waveform referenced with respect to an arbitrary reference voltage VREF, using the alternate embodiment circuit variation just described. The gray signal is the voltage waveform at the source of the transistor T5 in FIG. 1. As was mentioned before, since it is discarded, its illustration here is merely to show that where the input signal waveform is ambiguous in amplitude, then neither black nor white output signals are given by the circuit of FIG. 1.

While the invention has been particularly shown and described with reference to the preferred embodiment thereof, it will be understood by those skilled on the art that the foregoing and other changes in form and details may be made therein without departing from the spirit and scope of the invention.

We claim:

1. A circuit for establishing a first voltage threshold for a first signal discrimination level and a second voltage threshold for a second signal discrimination level, having a circuit input for receiving a series of input voltage pulses whose magnitudes are to be discriminated as belonging to said first or second levels, in an input signal whose instantaneous amplitude is the sum of the instantaneous amplitude of said input voltage pulses and the instantaneous amplitude of a background signal, comprising:

a first voltage comparator having a first input connected to said circuit input, a second input and an output, for providing a compare pulse at its output when said first input has a greater voltage magnitude thereat than said second input;

a first gate having a signal input connected to said circuit input, a control input connected to said output of said first comparator and a signal output, for transferring a signal from said circuit input to said first gate output when a control signal is received on said control input from said first comparator;

a first voltage level storage device having an input connected to said signal output of said first gate and a first circuit output, for storing the voltage magnitude of said signal transferred from said circuit input to said output of said first gate, at said first circuit output;

said first circuit output connected to said second input of said first comparator;

a second voltage comparator having a first input connected to said circuit input, a second input and an output, for providing a compare pulse at its output when said first input thereof has a lesser voltage magnitude thereat than said second input thereof;

a second gate having a signal input connected to said circuit input, a control input connected to said output of said second comparator and a signal output, for transferring a signal from said circuit input to said output of said second gate when a control signal is received on the control input thereof from said second comparator;

a second voltage level storage device having an input connected to said signal output of said second gate and a second circuit output, for storing the voltage magnitude of said signal transferred from said circuit input to said output of said second gate, at said second circuit output;

said second circuit output connected to said second input of said second comparator;

whereby said first threshold voltage is produced at said first circuit output and said second threshold voltage is produced at said second circuit output.

2. The circuit of claim 1, wherein said circuit input is connected to a charge transfer device string which periodically delivers said input voltage pulses under the control of a periodic clocking signal.

3. The circuit of claim 2, wherein said first and said second gates are enabled by said periodic clocking signal.

4. The circuit of claim 3, wherein said charge transfer device string is a bucket brigade device string.

5. The circuit of claim 3, which further comprises:

a NOR logic block having a first input connected to said output of said first comparator and a second input connected to said output of said second comparator, for generating an output signal on an output thereof when there is no signal on either of said first or second inputs thereof;

an AND logical block having a first input connected to said output of said NOR logical block and a second input connected to said periodic clocking signal, for generating an output signal on an output thereof when one of said input voltage pulses causes no output to be produced from either said first or said second comparator;

a third gate having a signal input connected to said circuit input, a control input connected to said output of said AND logical block, and an output connected to a supply voltage terminal, for transferring said one of said input voltage pulses from said circuit input to said supply voltage terminal;

whereby said input voltage pulses of indeterminate magnitude are discarded.

* * * * *